(12) United States Patent
Hooli et al.

(10) Patent No.: US 7,324,583 B2
(45) Date of Patent: Jan. 29, 2008

(54) CHIP-LEVEL OR SYMBOL-LEVEL EQUALIZER STRUCTURE FOR MULTIPLE TRANSMIT AND RECEIVER ANTENNA CONFIGURATIONS

(75) Inventors: Kari Hooli, Oulu (FI); Kai Kiiskilä, Oulu (FI); Jari Ylioinas, Oulu (FI); Markku Juntti, Oulu (FI)

(73) Assignee: Nokia Corporation, Espoo (FI)

( * ) Notice: Subject to any disclaimer, the term of this patent is extended or adjusted under 35 U.S.C. 154(b) by 703 days.

(21) Appl. No.: 10/783,049

(22) Filed: Feb. 19, 2004

(65) Prior Publication Data

US 2005/0180493 A1 Aug. 18, 2005

Related U.S. Application Data

(60) Provisional application No. 60/544,645, filed on Feb. 13, 2004.

(51) Int. Cl.
*H04B 1/00* (2006.01)
*H04B 7/02* (2006.01)

(52) U.S. Cl. .................. 375/148; 375/150; 375/267

(58) Field of Classification Search ............... 375/148, 375/150, 267
See application file for complete search history.

(56) References Cited

U.S. PATENT DOCUMENTS 6,259,720 B1 * 7/2001 Buss et al. .................. 375/130
2003/0002568 A1 * 1/2003 Dabak et al. ............... 375/148
2003/0095585 A1 * 5/2003 Huh et al. ................... 375/140
2004/0127164 A1 * 7/2004 Mondragon-Torres et al. ........................ 455/67.11
2004/0165653 A1 * 8/2004 Jayaraman et al. ......... 375/148
2005/0100052 A1 * 5/2005 Mailaender et al. ........ 370/479

FOREIGN PATENT DOCUMENTS

EP   1289182 A2   3/2003
EP   1357693 A1   10/2003

OTHER PUBLICATIONS

"Chip-Level Channel Equalization in WCDMA Downlink", Kari Hooli et al., EURASIP Journal on Applied Signal Processing 2002-8, pp. 757-770.
"A Generalized RAKE Receiver for Interference Suppression", Gregory E. Bottomley, et al., IEEE 2000, pp. 1536-1545.

(Continued)

*Primary Examiner*—Mohammed Ghayour
*Assistant Examiner*—Nurul M Matin
(74) *Attorney, Agent, or Firm*—Harrington & Smith, PC

(57) ABSTRACT

Disclosed is a chip-level or a symbol-level equalizer structure for a multiple transmit and receiver antenna architecture system that is suitable for use on the WCDMA downlink. The equalizer structure takes into account the difference in the natures of inter-antenna interference and multiple access interference and suppresses both inter-antenna interference and multiple access interference (MAI). Enhanced receiver performance is achieved with a reasonable implementation complexity. The use of the CDMA receiver architecture, in accordance with this invention, enables the realization of increased data rates for the end user. The CDMA receiver architecture can also be applied in conjunction with space-time transmit diversity (STTD) system architectures.

48 Claims, 3 Drawing Sheets

OTHER PUBLICATIONS

"V-BLAST: An Architecture for Realizing Very High Data Rates Over the Rich-Scattering Wireless Channel", P.W. Wolniansky, et al., IEEE 1998, pp. 295-300.

"Polit-aided Adaptive Chip Equalizer Receiver for Interference Suppression in DS-CDMA Forward Link", Frederik Petre et al., IEEE 2000, pp. 303-308.

Petre, F. et al., "Pilot-aided Adaptive Chip Equalizer Receiver for Interference Suppression in DS-CDMA Forward Link", IEEE: VTC 2000, pp. 303-308.

"Multi-antenna Transceiver Techniques for 3G and Beyond", Ari Hottinen et al., John Wiley & Sons, Chichester, UK, 2003, pp. 123-131.

* cited by examiner

CHIP-LEVEL OR SYMBOL-LEVEL EQUALIZER STRUCTURE FOR MULTIPLE TRANSMIT AND RECEIVER ANTENNA CONFIGURATIONS

CLAIM OF PRIORITY FROM COPENDING PROVISIONAL PATENT APPLICATION

This patent application claims priority under 35 U.S.C. §119(e) from Provisional Patent Application No. 60/544,645, filed Feb. 13, 2004, the disclosure of which is incorporated by reference herein in its entirety.

TECHNICAL FIELD

This invention relates generally to code division, multiple access (CDMA) receivers and, more specifically, relates to CDMA receivers having more than one receiver antenna for use in a wireless communication system having more than one transmit antenna.

BACKGROUND

An ongoing trend in modern wireless communication systems is to further increase the transmit data rates to enable the use of multimedia applications (e.g., those involving video and/or audio content) by wireless user equipment. The use of multiple transmit and receive antennas has been proposed, for example, in 3GPP (Third Generation, Partnership Project) discussions as a means to increase the data transmission rates. However, it can be appreciated that the use of multiple transmit antennas, where each antenna transmits an independent data stream using the same spreading sequence as the other antennas, will inevitably result in inter-antenna interference. The inter-antenna interference must be mitigated in order to successfully receive the transmitted data. In addition, other sources of interference can also deteriorate the performance of the receiver system. For example, multiple access interference (MAI) can be detrimental to receiver performance. In general, MAI is the signal interference experienced by the signal of the desired physical channel due to the presence of signals of other physical channels.

One of the main differences between inter-antenna interference and MAI is that the correlation with the spreading sequence at the receiver suppresses MAI by an amount that is a function of the spreading factor, while the variance of the inter-antenna interference remains substantially constant, and is not suppressed by the despreading process since it is induced by signals employing the same spreading sequence as the desired signal.

In a conventional code division, multiple access (CDMA) receiver, that is, in a conventional rake receiver, the receiver collects and combines only the received multipath signals. It is well known that a linear minimum mean square error (LMMSE) multi-user detector (MUD) has been developed for CDMA terminal receivers. However, adaptive versions of LMMSE MUD require the use of spreading sequences with a short period and, thus, LMMSE MUD is not appropriate for use in modem wideband CDMA (WCDMA) terminals.

Other types of receivers (other than rake) that are suitable for the reception of a WCDMA multiple input multiple output (MIMO) signal can be divided into two broad categories, namely, advanced WCDMA receivers and MIMO receivers. Advanced WCDMA receivers operate to provide additional suppression of MAI, while so-called MIMO receivers mitigate mainly inter-antenna interference. However, the advanced WCDMA receivers known to the inventors do not efficiently mitigate inter-antenna interference, and the majority of the MIMO receivers known to the inventors ignore the presence of MAI in their signal processing circuitry and algorithms.

More specifically, advanced WCDMA receivers either suppress or cancel MAI, thus achieving enhanced performance when compared to the conventional rake CDMA receiver. Those receiver architectures that provide for the suppression of MAI are considered as a more viable option for use in the WCDMA downlink (the direction towards the WCDMA user terminal equipment). It is noted that MAI can be divided into inter-cell and intra-cell interference. The inter-cell interference can be suppressed in the spatial domain, that is, with multiple receive antennas, while the intra-cell interference can be suppressed in the temporal domain. To achieve these goals two approaches have been proposed.

A first approach uses a linear channel equalizer that restores the orthogonality of physical channels, thus suppressing intra-cell interference while suppressing inter-cell interference in the spatial domain. The linear channel equalizer approximates the LMMSE MUD by ignoring the correlations between the spreading sequences in the received signal covariance matrix. In the case of single transmit antenna, the approximation results in good performance with a reasonable implementation complexity. The channel equalization can be implemented either at the CDMA signal chip level, prior to the correlation with the spreading sequence, or at the symbol (multi-chip) level. In the following discussion the chip level implementation is considered. Several adaptive algorithms have been proposed for use in the linear channel equalizer. For example, an overview of adaptive solutions is presented in K. Hooli, M. Juntti, M. Heikkilä, P. Komulainen, M. Latva-aho, and J. Lilleberg, "Chip-level channel equalization in WCDMA downlink," Eurasip J. Applied Sign. Proc. 2002, p. 757-770.

A generalized rake receiver (see, for example, G. Bottomley, T. Ottoson, and Y. P. Wang, "A generalized RAKE receiver for interference suppression," IEEE J. Selected Areas in Comm. 18, p. 1536-1545) approximates a matched filter in colored noise. Additional rake fingers (decorrelators) are allocated in the generalized rake receiver to process those delays that do not correspond to multipath delays. It has, been shown that the linear, channel equalizer and the generalized rake receiver are equivalent receivers under certain conditions.

A second approach is to suppress the inter-antenna interference (IAI) using the MIMO receiver architecture. For example, one proposed MIMO receiver is a Vertical BLAST (Bell Laboratories Layered SpaceTime), or V-BLAST, receiver for use in rich scattering MIMO environments (see P. Wolniansky, G. Foschini, G. Golden and R. Valenzuela, "V-BLAST: An architecture for realizing very high data rates over the rich-scattering wireless channel," in Proc. URSI Int. Symp. Sign., Syst. and Electr., September 1998, p. 295-300). In the BLAST approach the transmitted signal is received one layer at time, i.e., one transmit antenna at time, and all other layers are nulled with a zero-forcing algorithm. After the first layer is demodulated, the signal is re-modulated and cancelled from the received signal, which enhances the signal-to-interference-plus-noise ratio (SINR). This procedure is repeated after all layers are received. Variants of the V-BLAST approach have also been proposed.

In some variants MAI is suppressed with a filter that precedes the BLAST structure for mitigating inter-antenna interference.

Another option is to use different approximations of maximum a posteriori (MAP) detection. In a MAP detector the decision of a transmitted bit (a one or a zero decision) is performed after exhaustive and complex calculations are performed, during which a most probable transmitted bit is determined based on a priori probabilities of the bit and the received signal (see A. Hottinen, O. Tirkkonen and R. Wichman, "Multi-antenna Transceiver Techniques for 3G and Beyond", John Wiley & Sons, Chichester, UK, 2003). However, the approximations of MAP or maximum-likelihood sequence detection (MLSD) approaches have a considerable implementation complexity. The implementation complexity of the MLSD or MAP approximations can be a disadvantage when embodied in a battery powered user terminal that may have data processor speed and operating power consumption limitations.

SUMMARY OF THE PREFERRED EMBODIMENTS

The foregoing and other problems are overcome, and other advantages are realized, in accordance with the presently preferred embodiments of these teachings.

This invention provides in one aspect thereof a chip-level or a symbol-level equalizer structure for a multiple transmit and receiver antenna architecture system that is suitable for use on the WCDMA downlink. The equalizer structure takes into account the difference in the natures of inter-antenna interference and multiple access interference due to the properties of the corresponding spreading sequences and suppresses both inter-antenna interference and MAI. This advantageously provides for the suppression of inter-antenna interference and MAI in a balanced manner with respect to their deteriorating impact on symbol estimates. In the balancing procedure the technique takes into account the effects of signals orthogonal to the desired signal, as well as interfering signals from other transmit antennas using the same spreading sequence as the desired signal. By the use of this invention an enhanced receiver performance is achieved with a reasonable implementation complexity. The use of the CDMA receiver architecture in accordance with this invention, in a sophisticated communication systems with multiple transmit and receiver antennas such as in, for example, 3GPP Release 6, can be shown to enable the realization of increased data rates for the end user. The use of the CDMA receiver architecture in accordance with this invention can also be applied in conjunction with space-time transmit diversity (STTD) system architectures.

In one aspect this invention provides a system, apparatus and a method to update equalizer coefficients. In accordance with a method of this invention, a CDMA receiver has an input node coupled to a plurality S of receive antennas that receive signals from a plurality N of transmit antennas, J correlators for outputting soft symbol decisions, where J=N times the number of detected physical channels, and N equalizers each having an input coupled to said input node and an output coupled to associated correlators (the number of correlators equals the number of the detected physical channels). The CDMA receiver is operated so as to generate a channel estimate for each of the transmit antennas and to determine coefficients for each of the N equalizers in accordance with signals appearing at the input node, the channel estimates, and estimates of received chip energy per transmit antenna. The determined equalizer coefficients operate each of the equalizers for simultaneously suppressing inter-antenna interference and MAI so that the suppression of inter-antenna interference and MAI is balanced with respect to their deteriorating impact on symbol estimates.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
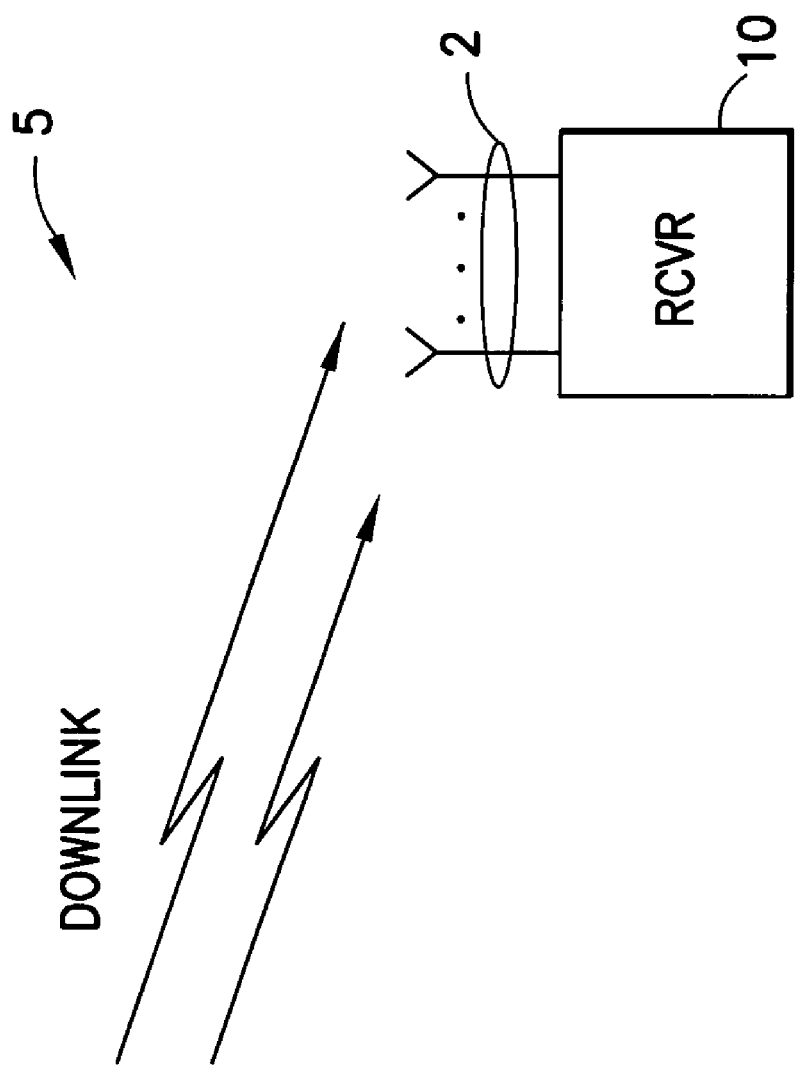
FIG. 1 shows a multi-transmit and multi-receive antenna wireless communication system that includes a CDMA receiver that is suitable for practicing this invention.

FIG. 1 shows a multi-transmit (e.g., two) antenna 1A, 1B and multi-receive antenna 2 wireless communication system 5 that includes a CDMA receiver 10 that is suitable for practicing this invention. The receiver may be a user device for receiving a downlink CDMA signal, such as a downlink WCDMA signal, compatible with, for example, existing or proposed WCDMA 3GPP specifications. The downlink WCDMA may convey multi-media information to the receiver 10 from the transmitter, which may be a base station that has the two transmit antennas 1A and 1B.

Figure 2:
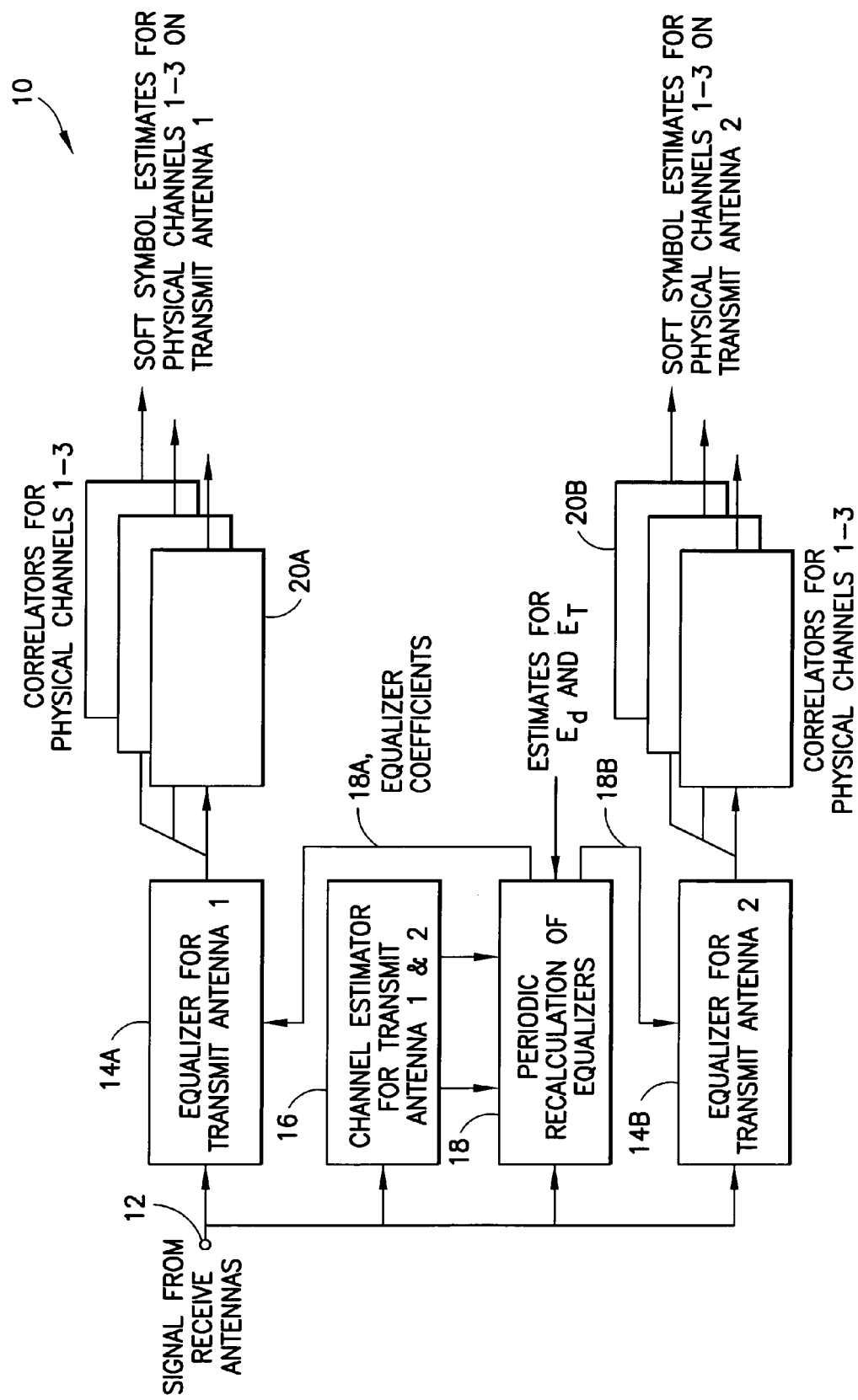
FIG. 2 is a block diagram showing an adaptive embodiment of the CDMA receiver of FIG. 1, that is constructed and operated in accordance with this invention, for use with two transmit antennas and three equalized and demodulated physical channels.

FIG. 2 shows a presently preferred embodiment of a CDMA receiver 10 wherein a linear channel equalizer (that may approximate a LMMSE MUD function) is modified so as to enhance the suppression of inter-antenna interference so that the suppression of inter-antenna interference and MAI is balanced with respect to their deteriorating impact on symbol estimates. Briefly, the CDMA receiver 10 includes an input node 12 for receiving a signal from the plurality of receive antennas 2 (not shown in FIG. 2) and for providing the received signal to input blocks 14A, 14B, 16 and 18. The input blocks include a first equalizer 14A for the first transmit antenna 1A, a second equalizer 14B for the second transmit antenna 1B, and a channel estimator 16 for the first and second transmit antennas 1A, 1B. The presently preferred technique for channel estimation is one based on pilot channel estimation, not blind estimation. The channel estimation can be done from the pilot symbols of a common pilot channel or from dedicated physical channels. In general, the channel estimates made from the common pilot channel are more accurate. Outputs of the channel estimator 16 for each transmit antenna 1A, 1B are provided to the block 18 that performs, in this embodiment, a periodic recalculation for the equalizers 14A and 14B, and that provides equalizer coefficient outputs 18A and 18B to the first and second transmit antenna equalizers 14A and 14B, respectively. The recalculate block 18 also receives estimates of the received energy per chip for a desired physical channel from a transmit antenna m ($E_d$) and for the total received energy per chip from transmit antenna m ($E_T$). The recalculate block 18 implements in hardware, software, or a combination of hardware and software, the computation of Equation (2) below. Chip energy estimates may be calculated from the pilot symbols of a dedicated physical channel, for example in a signal-to-interference-plus-noise ratio (SINR) estimation block. Chip energy estimates are also used in a symbol-level embodiment. Symbol energy estimates may be also used, instead of the product of chip energy estimates and spreading factor.

The output of the channel equalizer 14A for the first transmit antenna 1A is applied to a plurality of correlators 20A, one for each detected physical channel. The correlators 20A output soft symbol estimates for each of the three physical channels transmitted from the first transmit antenna A, and additional circuitry and/or software (not shown) bases hard symbol decisions on the soft symbol estimates. In a corresponding manner the output of the channel equalizer 14B for the second transmit antenna is applied to correlators 20B, one for each of the three physical channels, that outputs soft symbol estimates for each of the three physical channels transmitted from the second transmit antenna 1B.

For example, for a case of three demodulated physical channels there are three correlators for each receive antenna, or more generally for the case of N transmit antennas 1 there are J correlators 20 outputting soft symbol decisions, where J=N times a number of detected physical channels.

It should be noted that the number of receive antennas does not depend on the number of physical channels. As employed herein, a physical channel is a data steam for a certain user, and if the user receives more than one physical channel (more than one data stream) then the user may be said to receive multi-codes (i.e., multiple PN spreading codes are allocated to the user from the set of available spreading codes). The data may be sent to the user with multi-codes such that control information is sent to the user in one of the physical channels, while all of the physical channels are carrying data to the user. It should be also noted that some of the physical channels associated with the user can be received simultaneously with other receiving methods, e.g., received with a rake receiver.

By way of introduction, the conventional linear channel equalizer can be implemented as an adaptive finite-impulse-response (FIR) filter operating at the chip level (note that a symbol level implementation is equally possible). The FIR coefficients that maximize the average signal-to-interference plus noise ratio (SINR), per chip, are given by:

$$w_n = R^{-1} p_n, \quad (1)$$

where $w_n$ is a vector containing L filter coefficients for the equalizer assigned to the transmit antenna n, where R is an estimate of the received signal covariance matrix averaged over a scrambling sequence, and $p_n$ is the channel impulse response for the transmit antenna n. The vector $p_n$ contains the impulse response for all receive antennas.

The solution of Equation (1) ignores the fact that the MAI is suppressed during the correlation with the spreading sequence, whereas the inter-antenna interference is not suppressed due to the use of the same spreading sequence in the signals inducing inter-antenna interference. In other words, the foregoing solution is not a good approximation of the exact LMMSE MUD, when the multiple transmit antennas 1A, 1B are used.

In contradistinction to the conventional FIR filter-based CDMA receiver, in the CDMA receiver 10 of FIGS. 1 and 2 the coefficients for the equalizers 14A, 14B that are computed by and output from the recalculate block 18 are given by:

$$v_n = \left[ R + \sum_{m=1}^{N} (E_{d,m} G_d - E_{T,m}) p_m p_m^H \right]^{-1} p_n, \quad (2)$$

where $V_n$ is a vector containing L filter coefficients for the equalizer 14A or 14B that is assigned to the transmit antenna n, N is the total number of transmit antennas at the base station, $E_{d,m}$ is the received energy per chip for the desired physical channel from the transmit antenna m, $G_d$ is the spreading factor for the desired physical channel, $E_{T,m}$ is the total received energy per chip for the desired physical channel from the transmit antenna m, $(\ )^H$ is the Hermitean, i.e., the conjugate transpose of the argument.

In the solution of Equation (2), the terms emphasize the inter-antenna interference that is not suppressed in the correlation due the use of the same spreading sequence, and the terms remove the orthogonal signal component that is totally suppressed in the correlation due to the use of orthogonal spreading sequences.

There are various ways in which the invention can be embodied. For example, the equalizer coefficients can be updated continuously by using a least mean squares (LMS) or a recursive least squares (RLS) based algorithm. The adaptation of the equalizer coefficients can be performed at the symbol rate at the output of the correlator bank 20A or 20B that is assigned to a desired physical channel. Note that a similar type of adaptive implementation has been proposed for a channel equalizer $w_n$ in the case of one transmit antenna at a base station (see F. Petre, M. Moonen, M. Engels, B. Gyselinckx, and H. De Man, "Pilot-aided adaptive chip equalizer receiver for interference suppression in DS-CDMA forward link," in Proc. IEEE Vehic. Techn. Conf., Boston, USA, September 2000, vol. 1, p 303-308), but not for a multiple transmit antenna type of system.

In another embodiment, the embodiment of the recalculation block 18 shown in FIG. 2, the equalizer coefficients $v_n$ can be calculated periodically, e.g., once for a High Speed Downlink Packet Access (HSDPA) transmission time interval (TTI), or once per slot, or at any rate lower than the symbol rate. The equalizer coefficients $v_n$ can be calculated in various ways from the estimates of R, $p_n$, $E_{d,m}$ and $E_{T,m}$. Alternatively, the equalizer coefficients $v_n$ can be calculated from the estimates of $w_n$, $p_n$, $E_{d,m}$ and $E_{T,m}$.

The above-mentioned HSDPA is a packet-based data service with data transmission up to 8-10 Mbps (and 20 Mbps for MIMO systems) over a 5 MHz bandwidth in the WCDMA downlink. The HSDPA implementations include a short, 2-millisecond TTI, Adaptive Modulation and Coding (AMC), MIMO, Hybrid Automatic Request (HARQ), fast cell search, and advanced receiver design. In 3GPP standards, the Release 4 specifications provide efficient IP support enabling provision of services through an all-IP core network, and the Release 5 specifications focus on HSDPA to provide data rates up to approximately 10 Mbps to support packet-based multimedia services. MIMO systems are of interest in 3GPP Release 6 specifications, which are expected to support data. transmission rates up to 20 Mbps. HSDPA is evolved from, and is backwards compatible with, the Release 99 WCDMA systems.

The WCDMA receiver 10 suppresses both inter-antenna interference and MAI so that the suppression of inter-antenna interference and MAI is balanced with respect to their deteriorating impact on symbol estimates. This is an important distinction from conventional receiver solutions, having comparable complexity, that ignore either the inter-antenna interference or the MAI. As a result, the receiver 10 is less sensitive to MAI than other MIMO receivers. The improved receiver 10 equalizer enables the use of either higher end user data rates in frequency selective channels, for example in future 3GPP release versions with HSDPA or, alternatively, enables a more efficient use of the radio resources.

As was noted above, the receiver 10 can be implemented either at the chip level or at the symbol level (as is the case for a linear channel equalizer), thus allowing greater flexibility in the implementation. The symbol rate implementation results in a lower computational complexity when only a limited number of physical channels are used in the transmission.

The receiver 10 equalizer can be used as a user terminal receiver in HSDPA implementations, and in those that use multiple transmit and receive antennas. The receiver 10 equalizer can also be used in conjunction with STTD architectures.

Further in this regard, the use of the equalizer with a STTD system does not require changes in Equation 2. The symbols transmitted from multiple antennas with STTD are detected as they would be without STTD. In the case of the STTD system, however, there would be an additional block in FIG. 2 after the receiver 10, where the additional block would use the soft symbol estimates output from the receiver 10 to perform appropriate combining (see also FIG. 3). The equalizer can be similarly used with so-called Double Space Time Transmit Diversity (D-STTD) architectures as well (see, for example, "Improved Double-STTD schemes using asymmetric modulation and antenna shuffling", TSG-RAN Working Group 1 meeting #20, May 21-25, 2001, Busan, Korea, TSRG1#20(01)-0459).

Figure 3:
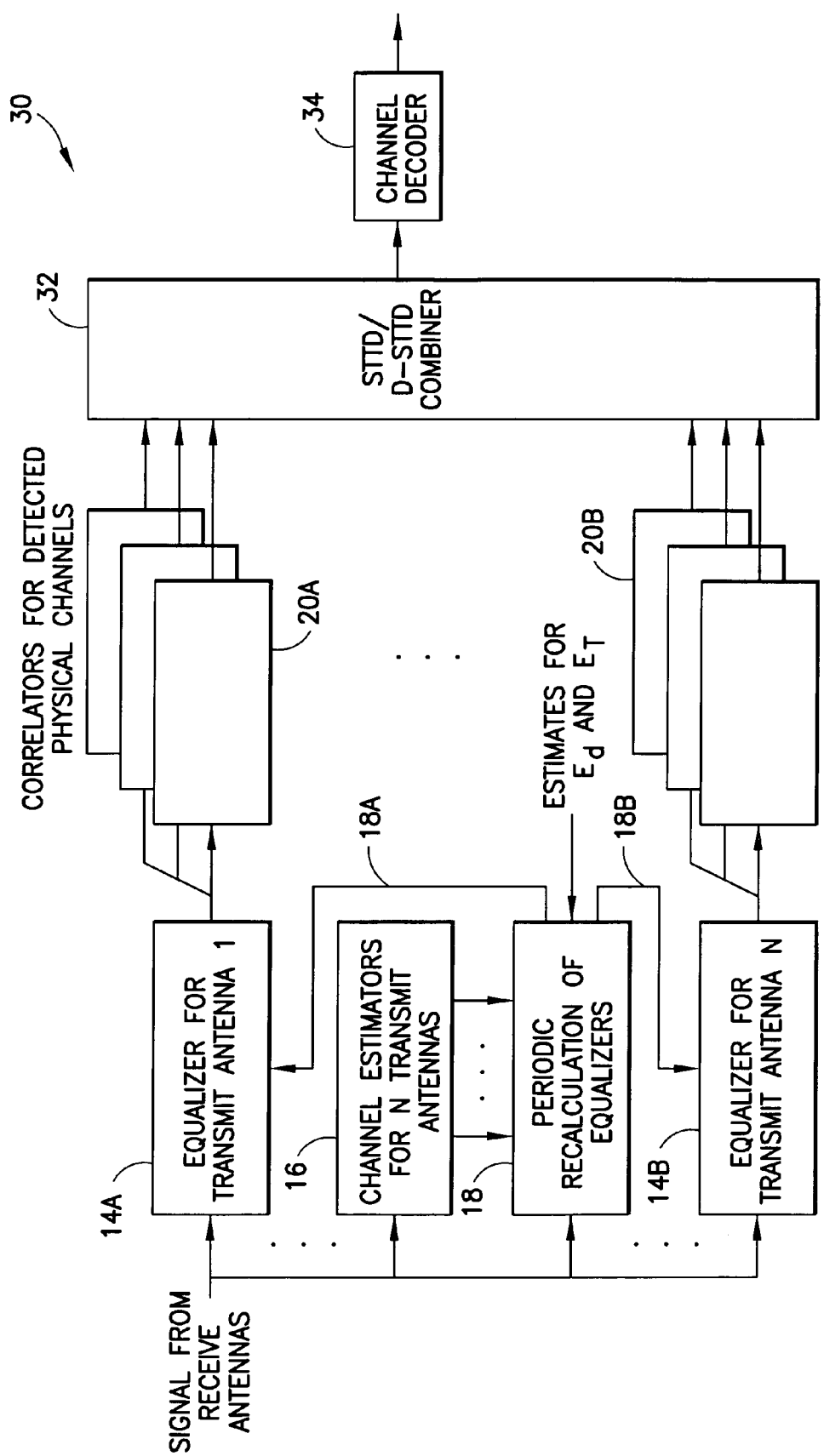
FIG. 3 is a block diagram of a STTD/D-STTD receiver architecture that is modified in accordance with this invention.

As but one example, FIG. 3 shows an embodiment of this invention in a STTD or a D-STTD receiver 30 with N transmit antennas and three detected physical channels. The channel estimator 16 and the periodic recalculation of equalizer coefficients block 18 can be as shown in FIG. 2 herein, and operate as described above in regards to Equation 2 and the related description. The outputs of correlators 20A, 20B are applied to a STTD or a D-STTD combiner 32, and the combined outputs are applied to a channel decoder 34.

In general, and by example, the equalizer in accordance with this invention can be used, with relatively small modifications to existing systems, as a terminal receiver in all direct sequence (DS) CDMA cellular networks that use multiple transmit and receive antennas and that employ orthogonal spreading sequences.

Further, this invention operates with one of orthogonal or non-orthogonal space-time codes.

The receiver 10 that contains the improved equalizer can be implemented in hardware. such as in an Application Specific Integrated Circuit (ASIC) or a Field Programmable Integrated Circuit (FPGA), or in software executed by a general purpose data processor or, more preferably, by a digital signal processor (DSP), or by a combination of hardware and software.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of more that two transmit antennas can be achieved with corresponding changes to Equation (2), as can different numbers of physical channels be used. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A code division, multiple access (CDMA) receiver having an input node coupled to a plurality S of receive antennas that receive signals from a plurality N of transmit antennas, comprising:

J correlators outputting soft symbol decisions, where J=N times a number of detected physical channels;

N equalizers each having an input coupled to said input node and an output coupled to as many correlators as there are detected physical channels of the said J correlators;

a channel estimator having an input coupled to said input node and N outputs representing a channel estimate for each of said transmit antennas; and a unit for computing coefficients for each of said N equalizers, said unit having a first input coupled to said input node, second inputs coupled to said N outputs of said channel estimator, and third inputs for receiving estimates of received chip energy per transmit antenna, said unit computing said coefficients so as to operate said equalizers for simultaneously suppressing inter-antenna interference and multiple user interference such that the suppression of the inter-antenna interference and the multiple user interference is balanced with respect to their deteriorating impact on symbol estimates.

2. A CDMA receiver as in claim 1, where said unit operates to compute $$v_n = \left[ R + \sum_{m=1}^{N} (E_{d,m} G_d - E_{T,m}) p_m p_m^H \right]^{-1} p_n,$$

where $v_n$ is a vector containing L filter coefficients for the equalizer assigned to transmit antenna n, R is an estimate of received signal covariance matrix averaged over a scrambling sequence, $E_{d,m}$ is the received energy per chip for a physical channel from transmit antenna m, $G_d$ is the spreading factor for a physical channel, $E_{T,m}$ is the total received energy per chip for the physical channel from the transmit antenna m, $(\ )^H$ is the Hermitean and $p_n$ is the channel impulse response for transmit antenna n, where vector $p_n$ contains the impulse response for all receive antennas.

3. A CDMA receiver as in claim 1, where said unit operates at a chip level.

4. A CDMA receiver as in claim 1, where said unit operates at a symbol level.

5. A CDMA receiver as in claim 1, where said unit updates said equalizer coefficients continuously using a least mean squares (LMS) or a recursive least squares (RLS) based algorithm.

6. A CDMA receiver as in claim 1, where adaptation of the equalizer coefficients is performed at a symbol rate at the output of a correlator bank.

7. A CDMA receiver as in claim 1, where said unit updates said equalizer coefficients periodically at High Speed Downlink Packet Access (HSDPA) transmission time intervals (TTI).

8. A CDMA receiver as in claim 1, where said CDMA receiver comprises a Space Time Transmit Diversity (STTD) architecture receiver.

9. A CDMA receiver as in claim 1, where said CDMA receiver comprises a Double Space Time Transmit Diversity (STTD) architecture receiver.

10. A CDMA receiver as in claim 1, where said CDMA receiver performs equalization at a symbol rate.

11. A CDMA receiver as in claim 1, where said CDMA receiver operates with one of orthogonal or non-orthogonal space-time codes.

12. A method to operate a code division, multiple access (CDMA) receiver that has an input node coupled to a plurality S of receive antennas that receive signals from a plurality N of transmit antennas, J correlators outputting soft symbol decisions, where J=N times a number of detected physical channels, N equalizers each having an input coupled to said input node and an output coupled to an associated one of said J correlators, comprising:

generating a channel estimate for each of said transmit antennas; and determining coefficients for each of said N equalizers in accordance with signals appearing at said input node, said channel estimates, and estimates of received chip energy per transmit antenna, said coefficients operating said equalizers for simultaneously suppressing inter-antenna interference and multiple user interference so that the suppression of the inter-antenna interference and the multiple user interference is balanced with respect to their deteriorating impact on symbol estimates.

13. A method as in claim 12, where determining coefficients solves:

$$v_n = \left[R + \sum_{m=1}^{N}(E_{d,m}G_d - E_{T,m})p_m p_m^H\right]^{-1} p_n,$$

where $v_n$ is a vector containing L filter coefficients for the equalizer assigned to transmit antenna n, R is an estimate of received signal covariance matrix averaged over a scrambling sequence, $E_{d,m}$ is the received energy per chip for a physical channel from transmit antenna m, $G_d$ is the spreading factor for a physical channel, $E_{T,m}$ is the total received energy per chip for the physical channel from the transmit antenna m, $(\ )^H$ is the Hermitean and $p_n$ is the channel impulse response for transmit antenna n, where vector $p_n$ contains the impulse response for all receive antennas.

14. A method as in claim 12, where determining coefficients operates at a chip level.

15. A method as in claim 12, where determining coefficients operates at a symbol level.

16. A method as in claim 12, where determining coefficients updates said equalizer coefficients continuously using a least mean squares (LMS) or a recursive least squares (RLS) based algorithm.

17. A method as in claim 12, where determining coefficients occurs periodically at High Speed Downlink Packet Access (HSDPA) transmission time intervals (TTI).

18. A method as in claim 12, where said CDMA receiver comprises a Space Time Transmit Diversity (STTD) architecture receiver.

19. A method as in claim 12, where said CDMA receiver comprises a Double Space Time Transmit Diversity (STTD) architecture receiver.

20. A method as in claim 12, where said CDMA receiver performs equalization at a symbol rate.

21. A method as in claim 12, where the method operates with one of orthogonal or non-orthogonal space-time codes.

22. A receiver having an input node coupled to a plurality S of receive antennas that receive signals from a plurality N of transmit antennas, comprising:

J correlator means for outputting soft symbol decisions, where J=N times a number of detected physical channels;

N equalizer means each having an input coupled to said input node and an output coupled to as many correlator means as there are detected physical channels of the said J correlator means;

channel estimator means having an input coupled to said input node and N outputs for representing a channel estimate for each of said transmit antennas; and means for determining coefficients for each of said N equalizers, said determining means comprising a first input coupled to said input node, second inputs coupled to said N outputs of said channel estimator means, and third inputs for receiving estimates of received chip energy per transmit antenna, said determining means determining said coefficients so as to operate said equalizer means for simultaneously suppressing inter-antenna interference and multiple user interference such that the suppression of the inter-antenna interference and the multiple user interference is balanced with respect to their deteriorating impact on symbol estimates.

23. A receiver as in claim 22, where said determining means operates to compute $$v_n = \left[R + \sum_{m=1}^{N}(E_{d,m}G_d - E_{T,m})p_m p_m^H\right]^{-1} p_n,$$

where $v_n$ is a vector containing L filter coefficients for the equalizer means assigned to transmit antenna n, R is an estimate of received signal covariance matrix averaged over a scrambling sequence, $E_{d,m}$ is the received energy per chip for a physical channel from transmit antenna m, $G_d$ is the spreading factor for a physical channel, $E_{T,m}$ is the total received energy per chip for the physical channel from the transmit antenna m, $(\ )^H$ is the Hermitean and $p_n$ is the channel impulse response for transmit antenna n, where vector $p_n$ contains the impulse response for all receive antennas.

24. A computer program product embodied on a computer readable medium for directing a computer to operate with a code division, multiple access (CDMA) receiver that has an input node coupled to a plurality S of receive antennas that receive signals from a plurality N of transmit antennas, J correlators outputting soft symbol decisions, where J=N times a number of detected physical channels, N equalizers each having an input coupled to said input node and an output coupled to an associated one of said J correlators, comprising operations of:

generating a channel estimate for each of said transmit antennas; and determining coefficients for each of said N equalizers in accordance with signals appearing at said input node, said channel estimates, and estimates of received chip energy per transmit antenna, said coefficients operating said equalizers for simultaneously suppressing inter-antenna interference and multiple user interference so that the suppression of the inter-antenna interference and the multiple user interference is balanced with respect to their deteriorating impact on symbol estimates.

25. A computer program product as in claim 24, where determining coefficients solves:

$$v_n = \left[ R + \sum_{m=1}^{N} (E_{d,m} G_d - E_{T,m}) p_m p_m^H \right]^{-1} p_n,$$

where $v_n$ is a vector containing L filter coefficients for the equalizer assigned to transmit antenna n, R is an estimate of received signal covariance matrix averaged over a scrambling sequence, $E_{d,m}$ is the received energy per chip for a physical channel from transmit antenna m, $G_d$ is the spreading factor for a physical channel, $E_{T,m}$ is the total received energy per chip for the physical channel from the transmit antenna m, $(\ )^H$ is the Hermitean and $p_n$ is the channel impulse response for transmit antenna n, where vector $p_n$ contains the impulse response for all receive antennas.

26. A computer program product as in claim 24, where determining coefficients operates at a chip level.

27. A computer program product as in claim 24, where determining coefficients operates at a symbol level.

28. A computer program product as in claim 24, where determining coefficients updates said equalizer coefficients continuously using a least mean squares (LMS) or a recursive least squares (RLS) based algorithm.

29. A computer program product as in claim 24, where determining coefficients occurs periodically at High Speed Downlink Packet Access (HSDPA) transmission time intervals (TTI).

30. A computer program product as in claim 24, where said CDMA receiver comprises a Space Time Transmit Diversity (STTD) architecture receiver.

31. A computer program product as in claim 24, where said CDMA receiver comprises a Double Space Time Transmit Diversity (STTD) architecture receiver.

32. A computer program product as in claim 24, where said CDMA receiver performs equalization at a symbol rate.

33. A computer program product as in claim 24, where the method operates with one of orthogonal or non-orthogonal space-time codes.

34. A receiver, comprising:
an input configured to input signals from a plurality S of receive antennas that receive from a plurality N of transmit antennas;

J correlator means for outputting soft symbol decisions, where J=N times a number of detected physical channels;

N equalizer means each configured to input the signals and an output configured to provide outputs to as many of said correlator means as there are detected physical channels of said J correlator means;

channel estimator means comprising N outputs representing a channel estimate for each of said N transmit antennas; and means for determining coefficients for each of said N equalizer means, said determining means having a first input configured to input the signals, a second input configured to input said N outputs of said channel estimator means, and a third input configured to input estimates of received energy per transmit antenna, said determining means configured to determine said coefficients so as to operate said N equalizer means for simultaneously suppressing inter-antenna interference and multiple user interference.

35. A receiver as in claim 34, where said determining means determines said coefficients such that suppression of the inter-antenna interference and the multiple user interference is balanced with respect to their deteriorating impact on symbol estimates, and operates to determine $$v_n = \left[ R + \sum_{m=1}^{N} (E_{d,m} G_d - E_{T,m}) p_m p_m^H \right]^{-1} p_n,$$

where $v_n$ is a vector containing L filter coefficients for an equalizer means assigned to transmit antenna n, R is an estimate of received signal covariance matrix averaged over a scrambling sequence, $E_{d,m}$ is received energy per chip for a physical channel from transmit antenna m, $G_d$ is a spreading factor for a physical channel, $E_{T,m}$ is a total received energy per chip for the physical channel from the transmit antenna m, $(\ )^H$ is the Hermitean and $p_n$ is a channel impulse response for transmit antenna n, where vector $p_n$ contains the impulse response for all receive antennas.

36. A receiver as in claim 34, where said determining means operates at one of a chip level or a symbol level.

37. A receiver as in claim 34, where said determining means is configured to update said equalizer coefficients continuously using a least mean squares (LMS) or a recursive least squares (RLS) procedure.

38. A receiver as in claim 34, where adaptation of the equalizer coefficients is performed at a symbol rate.

39. A receiver as in claim 34, where said determining means is configured to update said equalizer coefficients periodically at transmission time intervals.

40. A receiver as in claim 34, where said receiver comprises one of a space time transmit diversity architecture receiver or a double space time transmit diversity architecture receiver.

41. A receiver as in claim 34, where said receiver performs equalization at a symbol rate.

42. A receiver as in claim 34, where said receiver operates with one of orthogonal or non-orthogonal space-time codes.

43. A receiver as in claim 34, embodied at least partially in an integrated circuit.

44. A receiver as in claim 34, embodied at least partially in a software executable by a data processor.

45. A receiver as in claim 34, configured to operate in a code division multiple access system.

46. A receiver as in claim 34, configured to operate in a direct sequence code division multiple access system.

47. A receiver as in claim 34, configured to operate in a wideband code division multiple access system.

48. A receiver as in claim 34, configured to operate in a high speed downlink packet access system.

* * * * *